United States Patent [19]
Lowder et al.

[11] Patent Number: 5,492,771
[45] Date of Patent: Feb. 20, 1996

[54] METHOD OF MAKING MONOLAYER ABRASIVE TOOLS

[75] Inventors: James T. Lowder, Columbus; Roy F. Wielonski, Worthington, both of Ohio; Kosta L. George, Southbridge, Mass.

[73] Assignee: Abrasive Technology, Inc., Westerville, Ohio

[21] Appl. No.: 301,681

[22] Filed: Sep. 7, 1994

[51] Int. Cl.$^6$ ........................................... B22F 7/06
[52] U.S. Cl. ........................ 428/565; 428/546; 428/548; 428/551; 428/552
[58] Field of Search ................... 419/5, 8, 12, 13, 419/36, 56, 57; 51/295; 228/121, 56.3; 428/565, 546, 548, 551, 552

[56] References Cited

U.S. PATENT DOCUMENTS

| | | | |
|---|---|---|---|
| 2,343,957 | 3/1944 | Crompton, Jr. | 51/309 |
| 2,427,565 | 9/1947 | Liger | 51/309 |
| 2,562,587 | 7/1951 | Swearingen | 51/309 |
| 2,570,248 | 10/1951 | Kelley | 29/179.5 |
| 2,728,651 | 12/1955 | Hall | 51/293 |
| 2,961,750 | 11/1960 | Bender | 29/169.5 |
| 3,239,321 | 3/1966 | Blainey et al. | 51/309 |
| 3,356,473 | 12/1967 | Hull et al. | 51/309 |
| 5,062,865 | 11/1991 | Chen et al. | 51/295 |
| 5,151,107 | 9/1992 | Cho et al. | 51/295 |
| 5,186,380 | 2/1993 | Beeferman et al. | 228/121 |
| 5,340,012 | 8/1994 | Beeferman et al. | 228/56.3 |

OTHER PUBLICATIONS

H. Mizuhara and E. Huebel, "Joining Ceramic to Metal with Ductile Active Filler Metal" Oct. 1986.
Michael Seal, "A Review of Methods of Bonding or Making Electrical Contacts to Diamond" pp. 10–15.

*Primary Examiner*—Donald P. Walsh
*Assistant Examiner*—John N. Greaves
*Attorney, Agent, or Firm*—Francis T. Kremblas, Jr.

[57] ABSTRACT

An improved method of making a monolayer abrasive tool using a relatively low melting point, soft filler metal alloy braze which possesses sufficiently high yield strength combined with a relatively high ductility and low elastic modulus to produce an exceptional bond between a monolayer of superabrasive particles and the tool substrate. The steps of the brazing process include applying a layer of the filler metal alloy including a an active metal in either pre-alloyed or as a mixture with the metal alloy and a monolayer of superabrasive crystals over the filler metal layer. This assembly is heated in a mon-oxidizing atmosphere such as a vacuum to melt the alloy and braze bond the superabrasive particles to the tool substrate. The alloy bond formed possess the properties of a ductility of at least 20 percent elongation, an elastic modulus of less than $15 \times 10^6$ or less, and a yield strength preferably at least about 45,000 to 50,000 psi. A copper/silver based alloy including about 8 to 15 weight percent indium and 1 to 4 weight percent titanium is used in a preferred embodiment of the method disclosed.

9 Claims, No Drawings

METHOD OF MAKING MONOLAYER ABRASIVE TOOLS

TECHNICAL FIELD

The present invention relates generally to methods of making monolayer abrasive tools and particularly such tools employing a brazing process for bonding a monolayer of superabrasive particles to a substrate.

BACKGROUND ART

The manufacture of abrasive tools employing a monolayer of superabrasive particles is a relatively old art which has become increasingly important over the last two decades as such tools have found new applications as well as replaced more traditional metal, vitreous, and resin bonded multi-layered abrasive tools. Superabrasives are understood by those skilled in the art to mean synthetic or natural diamond, cubic boron nitride and any similar very hard abrasive materials.

Historically, monolayer abrasive tools used for heavier duty applications in the market place were primarily of electroplate construction utilizing mechanical entrapment of the abrasive particles until the early to mid-1970's when a brazing method was successfully introduced which braze bonded diamonds to a tool substrate using a hard, high strength alloy such as the nickel, chromium, boron containing alloy described in U.S. Pat. No. 3,894,673.

Since that time other brazing type processes for monolayer abrasive tools using strong, high melting point alloys have been described, however, to date none have achieved as wide spread acceptance as the tools described in the above referenced U.S. patent.

In the decades between the 1950's and 1970's, it was found that relatively low melting point and softer braze alloys, such as the silver/copper eutectic and near eutectic composition, in the presence of a relatively small amount of titanium or zirconium would readily wet diamond. This led to a recommendation of using such alloys to form monolayer diamond wheels using such brazes. However, subsequent experience in the field proved these alloys failed to form a bond exhibiting adequate mechanical properties which would retain the diamond particles under the rigors of grinding and cutting applications for commercial acceptance. Tools made using these teachings could not compete with the electroplated versions and were never acceptable by the industry. Therefore the use of such soft brazes have been essentially directed to less demanding non-abrasive tool application, such as the bonding of a single diamond crystal to a substrate for mounting a phonographic needle, or electronic semiconductor applications. More generally such alloys are promoted for bonding ceramics to ceramics or metals in other non-abrasive tool applications.

While it was recognized by many skilled in the art that the lower melting point braze alloys, such as mentioned above, exhibited many of the more desirable characteristics for braze bonding superabrasives, such as diamond, the mechanical failure of these softer alloys in the fabrication of commercially acceptable monolayer diamond tools led others to try to develop a process using stronger braze alloys which may adequately wet diamond and resist swarf abrasion to form a strong enough bond for commercially satisfactory acceptance. This led to the teachings of using a hard, strong nickel or cobalt braze as disclosed in U.S. Pat. No. 3,894,673.

The commercial success of the strong brazing alloy disclosed in the aforementioned U.S. Pat. No. 3,894,673 encouraged others skilled in the art to attempt to achieve an alternate brazing method using a high strength, hard alloy such as the molybdenum/iron alloy method disclosed in U.S. Pat. No. 4,968,326 which reportedly has some actual commercial use.

One of the drawbacks of the brazing process disclosed in U.S. Pat. No. 3,894,673 and others using the harder alloy systems is their relatively high melting point and significant difference in coefficient of thermal expansion between diamond and the alloy which introduces certain stresses upon the diamond crystals which are not relieved to the same extent as in the softer, lower melting point brazes. Further, such alloys do not readily wet cubic boron nitride particles without a metallic coating. The use of such nickel or cobalt based alloys also required the use of the high grade, less friable diamond particles which are better able to resist the stresses inherent in such processes to diminish instances of premature diamond crystal failure to an acceptable level.

An alternate more recently taken approach by a major U.S. manufacturer has used the near eutectic or eutectic silver/copper braze alloy with a titanium content for wetting to braze a monolayer superabrasive tool; however, they employ an electroless overplate of nickel-phosphorus in an attempt to overcome the known lack of mechanical strength of this relatively soft alloy. The electroless nickel overplate adds cost and further appears not to have improved the performance of such an abrasive tool which has been reported as still not possessing wholly satisfactory characteristics for abrasive tool applications. These characteristics include satisfactory cutting rates and sufficiently long useful life.

While many of those skilled in the art have attempted to improve upon existing technology directed to construction of a brazed monolayer abrasive tool over the last few decades, prior to the present invention, these attempts have failed to provide a commercially satisfactory abrasive tool having a monolayer of superabrasive particles which is useful for a wide variety of abrasive applications using solely a relatively low melting point braze alloy as the bonding medium.

BRIEF SUMMARY OF DISCLOSURE

The present invention relates to brazing processes for manufacturing abrasive tools and particularly to an improved process for brazing a monolayer of superabrasive particles to a substrate for abrasive tool manufacture using relatively low melting point alloys.

In accordance with the present invention it has been discovered that low melting point, relatively soft metal alloys, such as copper-silver based alloys, can be used to braze a monolayer of superabrasive particles to a metal substrate for abrasive tool manufacture to produce tools exhibiting unexpected, superior characteristics in many abrasive applications. The useful alloys of this type incorporate an active metal, such as titanium, in either a pre-alloyed or in a mixture form, in amounts necessary to achieve sufficient wetting and possess a yield strength greater than that of the copper/silver eutectic or near eutectic composition by preferably about 15 to 20 percent or greater.

These alloys also exhibit a sufficiently high ductility and a relatively low elastic modulus which is most advantageous for bonding a monolayer of superabrasive particles to various configurations of substrate surfaces for abrasive tool construction.

In a preferred embodiment of the brazing method of the present invention a copper/silver based alloy is employed with an amount of a metal, such as 10 to 15 percent by weight of indium for example, which has the effect of increasing the yield strength of the alloy without detrimentally affecting the high ductility and low elastic modulus which plays an important role in the formation of a good bond. An active metal such as titanium, is either pre-alloyed or mixed with the filler metal alloy in an amount sufficient to cause wetting to obtain the necessary chemical bond between the superabrasive particles and the substrate.

In essence, the method of the present invention relates to the discovery that certain relatively soft brazing alloys having a relatively low melting point and which possess only a relatively slightly increased yield strength characteristic compared to the well-known silver/copper eutectic compositions, can be pre-alloyed or mixed with between about 1 to 4 percent titanium to provide a monolayer abrasive tool possessing unexpected and surprising improved operating characteristics for many applications compared to such tools made using prior art processes.

The method of the present invention employs typical brazing techniques using a furnace having a good vacuum or other non-oxidizing atmosphere. Such other non-oxidizing atmosphere include an inert atmosphere, such as a high purity atmosphere of argon or helium, for example, as is well-known to those skilled in the art particularly when titanium is used as the active metal. A powdered alloy layer, including an active metal of the type described, is applied to the tool substrate using a temporary binder, and superabrasive particles are applied to the tool assembly by sprinkling or dipping using conventional techniques well-known in the art of good brazing practices to prepare the tool assembly for brazing in the furnace.

The resulting monolayer abrasive tools have exhibited remarkable operating characteristics contrary to prior conventional experience using the copper/silver eutectic alloy or similarly soft, relatively low melting point alloys. Further, tools made in accordance with the present invention show a marked improvement over the currently marketed electroplated tools and brazed tools using the strong nickel/cobalt type alloys in several abrasive tool applications.

DETAILED DESCRIPTION

The present invention relates generally to methods of manufacturing monolayer superabrasive abrasive tools and particularly to a novel and improved method of braze bonding a monolayer of superabrasive particles to a variety of abrasive tool substrate configurations using a relatively low melting point brazing alloy.

The improvement relates to the discovery that very common, relatively low melting point brazing alloys, generally related to the copper/silver eutectic or near mixtures, which have an increased yield strength of as little as about 10 to 25 percent over the eutectic silver/copper alloys, function unexpectedly well to bond a monolayer of superabrasive particles to a substrate for fabricating abrasive grinding and cutting tools.

It has long been known that the silver/copper eutectic or near eutectic compositions combined with a small percentage of an active metal, most commonly titanium, sufficiently wet superabrasive materials to form a bond. However, tools bonded in accordance with the these prior teachings failed to possess the necessary mechanical properties to sufficiently retain the superabrasive particles on the substrate during the rigors of abrasive tool applications. The failure of such tools to perform satisfactorily in abrasive tool applications led those skilled in the art to restrict use of such alloys to the much less rigorous, non-abrasive tool applications.

It should be noted that those skilled in the art recognize that the bonding characteristics required for a given application vary greatly and recognize the difference between various applications for retaining the crystal in the bond setting during the intended use of the article made. For example, there is a significant difference in the bonding requirements between multi-layered sintered abrasive tools and monolayer abrasive tools. Further, there is a significant difference in the bond strength required for bonding a single, relatively large crystal to a substrate for non-abrasive tool applications and for bonding a monolayer of multiple, relative small diamond particles to a substrate intended for abrasive tool grinding or cutting applications.

The clear failure of the relatively soft filler metal alloys, such as the copper/silver eutectic compositions, to perform acceptably in monolayer abrasive tool applications led those skilled in the abrasive tool art to search for a relatively much stronger, higher melting point braze, such as the nickel/cobalt based alloys referred to earlier herein, to solve the problems associated with brazing monolayer diamond abrasive tools.

However, in accordance with the present invention, it has been discovered that a silver/copper/indium alloy in the presence of an amount of titanium sufficient to promote good wetting, provides an excellent braze bond medium for a monolayer superabrasive tool even though the yield strength is only about approximately 45,000 to 50,000 psi. This is well below the lowest estimated yield strengths of the much harder nickel/cobalt type brazing alloys and merely approximately 10 to 20 percent greater than the approximately 40,000 psi value for the eutectic or near eutectic copper/silver alloys which failed in the past to make satisfactory monolayer abrasive tooling.

Testing of abrasive tools of various configurations, such as used in dental drills, have shown that tools made in accordance with the present invention exhibit a higher cutting rate and longer useful life in at least certain applications than the highly successful, commercially available tools made using the stronger and harder nickel based braze alloys. In view of the relatively rigorous conditions of cutting glass or natural tooth structure for example, such results are exceptionally surprising since the prior commercially available and very successful nickel based alloy bonded tools have been shown to be superior than traditional electroplated tools used in such applications.

One advantage of using the relatively softer, lower melting point braze alloy in accordance with the present invention is that they also very effectively bond uncoated cubic boron nitride crystals whereas the nickel or cobalt based brazing alloys do not.

A further advantage of the method of the present invention relates to the type of diamond crystal which may be advantageously used compared to the prior art brazing methods using the strong, high melting point braze alloys. In one of the preferred embodiments of the present invention, using a silver/copper/indium/titanium braze alloy, one may employ the lower grade, more readily friable type natural or synthetic diamonds which could not be as successfully used when bonded using the nickel type brazes referred to herein. Using the nickel based brazing process required using the higher grades of less friable diamond to avoid damaging the diamond crystals during processing to a point inducing premature tool failure.

In accordance with one of the preferred embodiments of the present invention, an alloy comprising 27.1 percent Cu; 59 percent Ag; 12.2 percent In; and about 2.0 percent Ti works very well to braze a monolayer of superabrasive particles, such as diamond or cubic boron nitride crystals to an abrasive tool substrate. This particular braze composition is a commercially available pre-alloyed powder presently sold by the Wesgo, Inc. under the trademark "INCUSIL-ABA" and is recommended for bonding ceramics to ceramics or to steel by the manufacturer. All percentages of various alloy compositions or mixtures thereof with an active metal referred to herein are expressed in terms of weight percent.

Alloys of this type suitable in accordance with the present invention have a relatively high ductility, typically about 10 to 20 percent elongation or greater, and a low elastic modulus of less than $15 \times 10^6$ psi and preferably about 11 to $13 \times 10^6$. The published yield strength of the INCUSIL-ABA alloy by the manufacturer is 49,300 psi. The high ductility reduces the stress transmitted to the superabrasive particles during cooling from the brazing temperature in the plastic region, thus fracture of the diamond crystal due to the thermal contraction mismatch between the abrasive particle and the alloy is minimized or entirely avoided. The relatively low elastic modulus results in lower stress exerted upon the diamond crystal during cooling in the elastic region and may also provide a greater damping effect compared to the priorly used higher melting point and less ductile nickel based brazing alloys. It is expected that there may be some increase in the hardness of the alloy in a degree commensurate with the slight increase in yield strength.

These features were demonstrated dramatically by using relatively low grade, highly friable diamond crystals to fabricate abrasive tools using the brazing alloy described above which showed excellent results in subsequent testing. Such highly friable diamond crystals heretofore were essentially only used for resin bonded tool applications as the prior tools fabricated using nickel based alloys or electroplate required use of the stronger, less friable diamond particles to avoid a high rate of crystal fracture during processing which resulted in rejected tools or premature failure during use through the loss of abrasive crystals due to pull out.

It is theorized that the use of such relatively more friable diamond particles than can be effectively used in prior art braze bonded tool applications may contribute to the improved results obtained in tools made according to the present invention via the creation of more new cutting edges on the particles during use as opposed to the particle surfaces becoming merely flattened during use.

The alloys useful in the present invention should be in the powdered form for use with the complex or curved shapes required in most abrasive tool applications such as, for example, those encountered in fabricating abrasive wheels and dental drills. Such shapes include spheres, cylinders, flame and various tapers. While some commercially available alloys are supplied in foil strip form, these are not well-suited for use in such applications. Powders or paste forms are generally more convenient for purposes of controlling the amount and distribution of the alloy on the tool substrates.

For economic practicability, commercially available braze compositions are convenient to use, such as INCUSIL (ABA) earlier disclosed herein, or other commercially available brazes without an active metal content which can be suitably modified by additions of an active metal to modify the braze composition formed during the brazing process to attain the necessary wetting properties for use in accordance with the present invention. Generally when such additions are made to such commercially available pre-alloyed powders, the active metal additive must be thoroughly mixed with the pre-alloyed powder to obtain a good distribution of the added active metal so that, upon melting during the brazing process, the necessary properties of the braze alloy formed are met without introducing localized portions of the braze alloy which may exhibit undesirable properties which would interfere with formation of the required bond of the abrasive particles to the tool substrate.

However, a pre-alloyed braze possessing the required characteristics described herein would work well, and if commercially available, be expected to be economically advantageous. Formation of a uniform, strong bond over the entire surface of the monolayer abrasive tool configuration is particularly important in abrasive tool applications. It is of prime importance when various complex shapes are involved to obtain a high quality, commercially acceptable tool.

The primary difference between the exceptional performance of the silver/copper based alloys employed in the method of the present invention for bonding a monolayer of superabrasive particles on an abrasive tool and the failure of the less strong eutectic and near eutectic silver/copper alloys to make commercially acceptable abrasive tools as taught in the prior art appears to be the relatively small increase in yield strength, while very importantly maintaining a sufficiently high ductility and low elastic modulus of the alloy bond formed.

While the low range of the yield strength required above the yield strength of the eutectic or near eutectic silver/copper alloy has not yet been specifically determined, it is believed that at least an increase of about 10 percent is required to achieve commercially practical results in bonding diamond or cubic boron nitride superabrasive particles for abrasive tool applications and an increase of about 20 percent has proven to be very sufficient to make tools having very excellent performance characteristics.

The disproportionate results obtained using tools made in accordance with the present invention, in comparison to those made using these low melting point alloys as taught in the prior art, is very surprising and unexpected to those of ordinary skill in the art. However, based upon this discovery, it is believed that silver/copper based alloys or those having similar properties relative to ductility and elastic modulus can be very useful in braze bonding in accordance with the present invention by additions of one or more compatible metals which increase the yield strength of the particular alloy by as little as about 10 to 15 percent over the yield strength of the silver/copper eutectic compositions as long as the ductility remains high enough and the elastic modulus remains low enough to reduce the stresses applied to the superabrasive crystals during the brazing process.

Such alloy compositions can be fashioned by those of ordinary skill in the art following the teachings of the present invention such that the more preferred, relatively low melting point is maintained to reduce the brazing temperatures required and still provide the desired increased yield strength and the levels of high ductility and low elastic modulus as disclosed herein. The performance improvement of tools made in accordance with the present invention compared to commercially available tools made using the higher strength nickel/cobalt type braze alloys appears to indicate that merely increasing the yield strength without retaining the high ductility and low elastic modulus will not produce the superior results obtained in accordance with the present invention.

There is very little yield strength information published relating to many alloy systems. One reason is the emphasis placed by those of ordinary skill in this art on joint strength which is dominated by the bond strength formed at the interfaces of the materials joined rather that the yield strength of the filler metal alloy. Information published by Wesco, Inc., for a limited number of alloys clearly shows the addition of certain elements such as 10 to 15 percent of indium materially increases the yield strength of the near eutectic composition of 63 percent Ag-35.2 percent Cu with a titanium content of 1.75 percent. Once this discovery of the necessary incremental increase in yield strength was made herein, it would appear other elemental additions to the eutectic or near eutectic compositions of silver and copper would likely have beneficial strengthening effects. Tin would be expected to be a substitute for indium based on similarities of alloying with both silver and copper. Wesco, Inc. reports in a published data sheet for a 68% Ag-5% Pd-27% Cu alloy (tradename Palcusil 5) a yield strength of 48,300 psi. This represents an increased yield strength over the near eutectic silver/copper alloy which is directly attributable to the addition of 5 percent of Pd. Phosphorus is also a well known strengthening addition for copper alloys through the formation of intermetallic phases which strengthen through a dispersion mechanism. Thus, there are many potential additions which can be made to strengthen the Cu-Ag base to an effective level as taught by the present invention, however, the unavailability of many of such potential useful alloy compositions, except by special order, make testing economically impractical at this time.

In addition to those already mentioned, singly or in combination, aluminum, silicon, zinc, cadmium, manganese, germanium, nickel, cobalt, iron are good candidates as strengthening agents. The amounts of additions of these elements will vary considerably to accomplish the necessary strengthening without detrimentally affecting the ductility and elastic modulus but in no case mentioned would a small amount expect to be operable. In general, more than 5% by weight addition of a compatible metal would be expected to be required. Braze filler metal alloys exist commercially which are based on systems other than Cu-Ag, and which respond to the addition of an active metal to wet diamond and cubic boron nitride. Therefore one would expect that some among these are likely to exhibit the mechanical properties described herein and may be suitable to fabricate abrasive tools which exhibit the outstanding performance observed with the Ag-Cu based systems specifically disclosed herein.

The introduction of an active metal, such as titanium, is preferably through pre-alloying or by some form of thorough mixing with the alloy filler metal. It is also known that with considerable care of the furnace atmosphere to avoid oxidation in the early stages of heating to the fusion point, titanium metal powder can be used rather than the more usual titanium hydride powder. Additional elements which may be utilized to effect the wetting of the abrasive particles are well known to those skilled in the art and include zirconium, chromium, molybdenum, vanadium, niobium and tantalum. The exact selection of such active metals to obtain the necessary degree of wetting would normally depend on some specifics of the filler metal alloy selection. Titanium seems to be a preferred active metal for many active metal brazes and, particularly is most often included in the silver/copper based compositions of active brazing filler metals.

The tenacity of the retentive strength of the bond medium in the abrasive tools made in accordance with the present invention as shown by the comparative tests noted in the Examples described later herein is evidenced by the faster cutting rates and increased longevity of the abrasive tool as rated on the quantity of work performed. These results are extraordinary and run totally contrary to conventional wisdom based upon the prior experience with the relatively soft alloys attempted to be used in this field. The superior performance characteristics of monolayer abrasive tools made in accordance with the present invention as compared to those made by the highly commercially successful strong nickel based alloys are totally unexpected and are truly a very significant advance in the art. This is particularly true when one considers that a solution to the problems associated with brazing a monolayer of diamond and cubic boron nitride crystals for abrasive tool applications has been under much investigation by those skilled in the art for several decades.

It should be pointed out that the advantages of the method of the present invention could also be realized by an equivalent two step process wherein the filler alloy metal braze including titanium in pre-alloyed or admixed form was applied to the tool substrate and heated in the same type furnace to adhere to the substrate, followed by later adding the superabrasive particles in the manner disclosed herein; and then introducing the tool assembly into the furnace to re-melt the filler metal alloy layer to braze bond the crystals to the substrate. While less preferred, the introduction of sufficient amounts of an active metal to the tool assembly can be accomplished in other ways, such as by merely sprinkling the active metal powder or its hydride over the layer of the filler metal alloy before or after affixing the superabrasive particles in place.

The following examples will more clearly illustrate the method of the present invention.

EXAMPLE I

A round tip and tapered dental tool with diamond particles was constructed using Wesgo Incusil-ABA™ brazing alloy in paste form. The paste is merely a mixture of the alloy powder and a temporary conventional binder material. The nominal alloy composition of this material is In-12.2%, Cu-27.25%, Ag-50%, Ti-2.0%. The INCUSIL-ABA™ paste was used as received from the manufacturer and applied to the dental tool blank forming the substrate. The braze weight applied was determined to be 0.025 gram/tool. A synthetic diamond (American Boarts Crushing Co., Inc. trade designation ABS-3) of mesh size 120/140 was conventionally applied to the braze paste coated tool. The weight of diamond particles was determined to be 0.090 grams for this experiment. The finished tool assembly was prepared for brazing according to conventional processing information supplied by Wesgo, Inc. A vacuum furnace capable of achieving a vacuum level of $1 \times 10^{-6}$ torr with an air leak rate of less than 3 microns/hr was used to perform this brazing operation. Prior to performing the brazement, a vacuum level of $2 \times 10^{-6}$ was achieved. Prior to performing the vacuum braze operation, the tools were dried in air for 30 minutes at 80 deg. C. The tools were loaded into the vacuum furnace and the furnace evacuated to a level of $1 \times 10^{-6}$ before initiating the braze cycle. The tools were heated in a vacuum environment for 60 minutes at 500 deg. C., then the temperature was increased at a rate of 2 to 5 deg. C./min to 740 deg. C. The tools were held in a range of 740 to 742 deg. C. for 15 minutes and cooled to 500 deg. C. at 4 deg. C./min.

Further cooling to 236 deg. C. occurred at a rate of 6 deg. C./min. At or near 200 deg. C., the tools were removed from the furnace for examination and testing. During the entire process the vacuum level never exceeded the $1\times10^{-5}$ torr range. Following the removal of the tools from the furnace they were examined and tested. The diamond abrasive was wet by the braze alloy which flowed well and bonded to the steel dental tool blank. Full depth cutting tests in glass were made and a qualitative evaluation by experienced personnel indicated excellent performance by these tools relative to perceived cutting rates and the integrity of the bond holding the abrasive particles in position on the tool substrate.

EXAMPLE II

A dental tool was constructed using an alloy powder (Cu-24%,Ag-61.5%,In-14.5) sold by Wesgo, Inc. under the registered trademark INCUSIL 15 which was blended with titanium hydride powder to achieve a total titanium composition of approximately 4 weight percent of the total mixture. Two different mesh sizes of the INCUSIL 15 powder were selected, namely 200/325 and −325. The titanium hydride (99%–325 mesh size) used was a readily commercially available product. The first stage in the tool construction process was the application of the braze alloy powder which consisted in applying 2 coats of a braze alloy containing the titanium hydride powder. The first coat contained the 200/325 mesh size powder which was prepared by blending the alloy powder with a quantity of titanium hydride powder to produce a titanium hydride content of 4 percent by weight of the total mixture. This alloy and titanium hydride mixture was milled to thoroughly mix the materials. The mixture was sieved to remove the fine 325 mesh titanium hydride powder. Analysis by induction coupled plasma spectroscopy performed on this powder indicated that a residual titanium content of 0.09% remained. The second coat consisted of the silver/copper alloy powder in the —325 mesh size blended with the titanium hydride powder to prepare a mixture having a titanium hydride content of approximately 11 to 12 percent by weight of the total mixture. Analysis of this material by the above method showed a 11.1 wt % titanium content. A weight measurement was taken to quantify the amount of total metal braze powder and titanium applied in each dip step. It was determined that the two coats of powder combined to yield a silver/copper/indium powder with a 4.0 percent titanium content by weight. Each powder dip is preceded by the application of a conventional binder, based on aromatic hydrocarbon resins and aliphatic organic compounds, to hold the powder in place. A moderately friable synthetic diamond, sold under the trade name General Electric MBS 300 by the General Electric Company, was uniformly applied to these tools after application of a conventional temporary binder. Based on weight measurements, 0.0078 grams of the friable synthetic diamond (120/140 mesh) was applied. Prior to performing the vacuum braze cycle, the constructed tools were heated in air for 2 hours at 250 deg. F., to thoroughly dry the binders.

The brazing cycle was performed in the same vacuum furnace described in Example I and under the same vacuum conditions described. The process cycle was the following: (1) the temperature of the furnace is raised to 400 deg. C. at the rate of 10 to 15 deg. C./min. and held at 410 deg. C. for 20 minutes; (2) the temperature is then raised to 858 deg. C. at a rate of 10 to 15 deg. C./min. and maintained at 858 deg. C. for 30 minutes; and (3) in order to maintain the desired hardness of the tool blank, the tools are rapidly cooled with a helium quench gas at a rate of 130 deg. C./min.

The tools were then removed from the furnace at a temperature below 200 deg. C. for examination and testing. The braze flowed well and the bond of the diamond abrasive to the steel tool appeared to be well formed. A glass grinding test to evaluate retention of the diamond crystals was performed. A quantity of 5 grams of glass was removed. The tools were weighed before and after the test grinding to determine the change in weight which is essentially attributed to the loss of diamond using this braze alloy construction. The total loss of weight after the test amounted to 3.4% of the total weight of the alloy and diamond particles added to the substrate.

EXAMPLE III

A dental tool of the type of Example II was constructed using a final metal alloy composition of 63% Ag, 25% Cu, 7% Sn, 5% Ti. This tool was made in the same manner as described in Example II by applying one coating of an alloy having a composition of 72% AG, 28% Cu plus an addition of 0.6% titanium hydride powder. A second coating of a mixture of metal powders having a composition of 55% Ag, 21% Cu, 13% Sn and 11% titanium hydride. Brazing was performed in the same manner as described in Example II. Visual examination revealed the braze flowed well and securely bonded the diamond crystals to the tool. The bond appeared homogeneous. Cutting performance was evaluated in the same manner as in Example II. The tool removed 5.1 grams of glass while experiencing a weight loss of 5% based upon the total weight of the alloy bond and diamond applied. Examination of the tool after the test revealed several crystals fractured but generally was in otherwise good condition.

EXAMPLE IV

A diamond abrasive tool of the same configuration as described in Examples II and III and commercially available from Abrasive Technology, Inc. under the registered trademark TWO STRIPER was fabricated using the standard fabrication techniques and a nickel braze containing chromium such as described in U.S. Pat. No. 3,894,673. The tool was tested under the same conditions as the tools described in Examples II and III. The tool was used to grind glass until the end of its effective life. At this point the test grinding was stopped and the amount of glass removed was approximately 4 grams. The tool showed a 9 percent weight loss of the total weight of the diamond and braze alloy applied to the tool which is greater than 50 percent more than the tools described in the prior examples which were used to remove 5 grams of glass during the test procedure.

EXAMPLE V

Small spherical grinding wheels were fabricated using a steel substrate and a monolayer of a cubic boron nitride (CBN) crystals following the same procedures described in Example II using a commercial copper/silver/indium braze powder (INCUSIL 15) with approximately a titanium hydride content of approximately 1.6 wt percent. The titanium hydride powder was thoroughly mixed with the pre-alloyed commercial braze powder. The CBN crystals were purchased from General Electric Company and identified under the trademark CBN500.

For comparison test purposes, similar wheels were made following the some procedure except the braze used was the copper/silver eutectic sold under the trademark "CUSIL", identified earlier herein, with approximately 1.6 wt percent titanium hydride powder thoroughly mixed into the pre-alloyed eutectic mixture powder.

The cubic boron nitride crystals used were 60 mesh size and grit concentrations applied to all of the above tools were rated between 7 to 8 on a scale of 1 to 10. The 10 rating represents the maximum practical concentration of abrasive crystals that could be applied.

These tools were tested under current manufacturing specifications of a commercial company for grinding hardened steel parts. The abrasive tools are rated by the number of parts which can be ground until the tool is spent. The performance leader, prior to these tests, for this particular grinding process was an electroplated, commercially available, spherical wheel with a monolayer of CBN abrasive crystals and was reported to grind an average of approximately 100 parts per wheel before becoming spent. A further comparison with a commercially available spherical wheel constructed using a copper/silver eutectic mixture braze including a sufficient titanium content to achieve wetting and having an electroless nickel/phosphorus overplate was reported to grind approximately 80 parts per wheel.

The test wheels described above were tested on the basis of useful life for the number of parts produced until the abrasive wheel was spent.

The spherical wheel tested using only the CUSIL alloy with titanium hydride added as described ground 90 parts until useful life was ended. The two wheels tested which were brazed with INCUSIL 15 with titanium hydride added in accordance with the present invention averaged 158 ground parts per wheel prior to becoming spent. This represented almost a 60 percent improvement over the prior electroplated performance leader and a much larger percentage improvement over the other differently constructed tools noted above.

EXAMPLE VI

Several dental tools having a conventional round tip with a tapered configuration were made in the same manner as in Example II for comparison tests with similar configured commercially available dental tools sold by Abrasive Technology, Inc. of Westerville, Ohio under the trademark TWO STRIPER and brazed using a nickel based, chromium containing alloy.

The test procedure involved performing full crown preparations on extracted human molars. This procedure involved removal of tooth structure around the total circumferences of the molar to a depth of 1 mm over a tooth length of 4 mm.

Nine tools constructed in accordance with Example II were compared to a like number of the commercially available TWO STRIPER nickel based brazed tools. Each tool was tested on the basis of performing 12 full crown preparations as described above. Instantaneous cutting rates for each tool tested were determined prior to use of each tool and at intervals after the tool was used to cut 2,4,6,8,10 and 12 full crown preparations.

The instantaneous cutting rates for each tool were determined on an automated test apparatus which controlled the speed of rotation, force applied and the depth and very brief time of a cut made by each tool tested after each of these test intervals on sections of natural human molar tooth structures.

The average instantaneous cutting rate for the different tools at each test interval was determined and a comparison of the average results for both groups of tools showed that the tools constructed in accordance with the present invention exhibited significantly higher cutting rates at the beginning and throughout the duration of the 12 full crown preparations than the commercially available tools. This is particularly surprising in view of the fact that the commercially available nickel based brazed tools are a recognized leader in the dental tool industry and have established a high reputation for quality of performance relative to cutting rates and tool life.

We claim:

1. A diamond abrasive tool comprising, in combination, a metal tool substrate and a monolayer of superabrasive particles bonded to said substrate by a braze alloy bond composition comprising approximately a combined amount of Ag and Cu of at least 70 percent by weight, an amount of an active metal sufficient to cause said braze alloy to wet said superabrasive particles and substrate upon being heated to the alloy's melting point, said braze alloy characterized by having an elastic modulus of at least $15 \times 10^6$ or less, a ductility of at least about 10 percent or greater, and a yield strength of at least about 45,000 psi.

2. The tool defined in claim 1 wherein said braze alloy bond composition includes at least three metals and has a yield strength of at least about 48,000 psi.

3. The tool claims in claim 1 wherein said active metal is titanium.

4. The tool defined in claim 1 wherein said braze alloy bond composition includes indium in an amount between about 8 to 15 percent by weight.

5. An abrasive tool having a monolayer of superabrasive particles brazed to a tool substrate made by a method comprising the steps of:

a) applying a layer of superabrasive particles and a layer of a filler metal alloy admixed with or including an active metal to a tool substrate using a temporary binder to form a tool assembly;

b) heating said tool assembly in a non-oxidizing atmosphere to a temperature sufficient to melt said filler metal alloy and braze bond said superabrasive particles to said substrate; wherein the filler metal alloy comprises a metal alloy having an elastic modulus of about $15 \times 10^6$ or less, a ductility of at least 10 percent elongation, and a yield strength greater than about 45,000 psi.

6. The abrasive tool defined in claim 5 wherein said filler metal alloy includes Ag and Cu in a combined weight percent of the total alloy of at least about 70 percent.

7. The abrasive tool defined in claim 5 wherein said filler metal alloy is in powdered form and said tool substrate carrying said superabrasive particles forms a curved surface.

8. The abrasive tool defined in claim 5 wherein said active metal is titanium.

9. The abrasive tool defined in claim 6 wherein said filler metal alloy includes about 8 to 15 percent by weight of indium.

* * * * *